Patented June 26, 1951

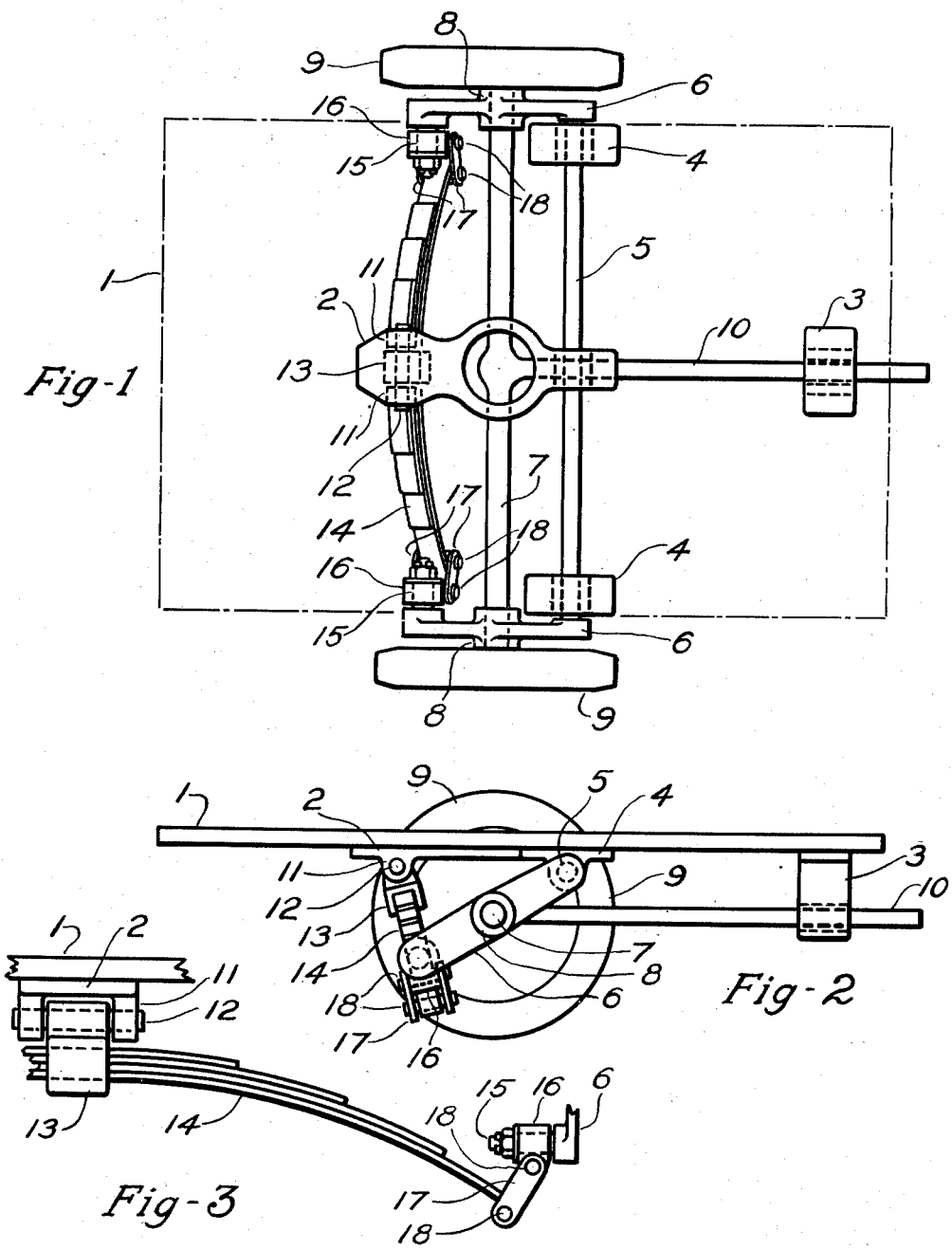

2,558,310

UNITED STATES PATENT OFFICE 2,558,310

TRAILER AXLE

John Moore, Oakland, Calif., assignor, by mesne assignments, of one-half to Planamatic Corporation, Oakland, Calif., a corporation of California Application September 17, 1946, Serial No. 697,474

4 Claims. (Cl. 267—19)

This invention relates to wheeled vehicles, and more particularly, to vehicles provided with resilient mountings.

The principal object of my invention is the provision of a mechanism adapted to maintain the floor of a vehicle in a horizontal transverse position under any condition of loading within the capacity of said vehicle.

Another object of the invention is the provision of stabilizing means adapted to eliminate lateral tilting of a vehicle due to shifting of a load in said vehicle.

A further object of the invention is the provision of means adapted to maintain a relationship of parallelism between the floor of a vehicle and the axle upon which it is mounted.

The method of accomplishing the above results will become apparent as the description proceeds.

Referring to the drawing illustrating my invention, the scope whereof is defined by the appended claims:

Figure 1 is a plan of an embodiment of my invention, the floor of a vehicle being indicated in phantom in order to better delineate the various elements of my apparatus and their particular arrangement.

Figure 2 is a side elevational view of the embodiment of my invention disclosed in Figure 1, the near side wheel being removed.

Figure 3 is a fragmentary view of the vehicle spring and its connecting elements.

Referring to the drawing in detail, like parts being designated by like characters throughout the various views, it will be noted from Figure 1 that the apparatus is symmetrical about a longitudinal median line, similar parts performing similar functions.

In this showing the floor of a vehicle body 1, has attached to it, by any suitable means, brackets 2, and 3, and pillow blocks or bearing members 4. Pivotally mounted in the pillow blocks or bearing members 4, and passing through bracket 2, there is a torsion shaft 5, having cranks or lever members 6, fixedly mounted upon the ends thereof. The shaft 5, thus maintains the cranks or lever members 6, in angular coincidence at all times. The cranks or lever members 6, are mounted intermediate their ends on an axle 7, which passes through bosses 8, which, as here shown, are located substantially midway between the ends of these cranks or lever members 6.

Wheels 9, are rotatably mounted upon the axle 7. Secured to axle 7, at its center point, there is a tongue or draw bar member 10, which passes loosely through bracket member 3. This arrangement of the tongue 10, and bracket 3, tends to relieve the junction of axle 7 and tongue 10 of any bending stress that may be imposed when, for example, the vehicle is being drawn around a curve.

The tongue member 10, may be formed at its projecting or towing extremity in any fashion that the services of a vehicle demand. As an alternative arrangement the tongue 10 may be employed independently of a drawbar by attaching the drawbar directly to the vehicle body.

Projecting downwardly from bracket 2, are aligned bosses 11, through which passes a pin 12 and pivotally mounted upon the pin 12, there is a spring clamp 13, which has passing through it and secured thereto, a transversely disposed leaf spring 14, of conventional design. The swinging or trailing ends of cranks or lever member 6, are equipped with studs 15, which have pivotally mounted thereon, universal block members 16.

The spring 14 is flexibly connected at its ends to the block members 16, by spring shackles 17, and shackle pins 18. From this it will be seen that in such an arrangement of parts with the clamp 13, pivoting on pin 12, and shackles 17, with the pins 18, working in conjunction with the block member 16, pivoting on pin 15, a free movement of spring 14, will be allowed throughout its useful range.

From the foregoing disclosure it will be apparent that I have devised a mechanism that will ensure against lateral tilting of a resiliently mounted vehicle body regardless of the location of a concentrated load.

The above is explained by the fact that when a load is applied at any point upon the upper surface of the floor 1 of the vehicle body, this load will be transmitted through the pillow blocks or bearing members 4 to the torsion shaft 5, which in turn will cause the cranks or lever members 6 to pivot about the axis of the axle 7 as a fulcrum. This turning motion of the cranks or lever members 6 will at the same time be resisted by the leaf spring 14 in cushioning the load.

With the cranks or lever members 6 fixedly secured upon the ends of the torsion shaft 5 it will be seen that they will be held in substantially the same operating plane at all times, and with a uniformly distributed load upon the floor 1 of the vehicle body it will be seen that the axle 5 will always be held in parallel relationship with the floor 1 of the vehicle body.

If it is now assumed that the vehicle floor 1 is non-uniformly loaded, so that more of the weight is imposed upon one of the cranks or lever members 6 than on the other, or as a result of turning a corner at high speed, any tendency for the more heavily loaded lever member 6 to pivot independently of the other crank or lever member 6, will be resisted by the torsion shaft 5. This will cause the lightly loaded lever member 6 to also pivot in a substantially corresponding manner and thus the axle 7 will be held in substantial parallelism with the floor 1, or the vehicle body. Under the most favorable conditions it is contemplated that the torsion shaft 5 will be of a character that will permit a slight transient angular displacement between the cranks or lever members 6 when in operation. This will avoid any severe shock or damage to the vehicle upon an initial impact against one of the wheels 9, after which the lever members 6 will assume their normal operating positions as shown.

Although a preferred embodiment of my invention has been disclosed, it will be understood that modifications may be made within the spirit and scope of the appended claims.

I claim:

1. In a means for maintaining the floor of a transverse axle supported vehicle in a substantially level plane, the combination of a vehicle body having a horizontally disposed floor, an axle disposed below said floor and extending transverse to said vehicle body, a pair of lever members mounted intermediate their ends upon said axle, one of said members being disposed at each end of said axle at a downwardly inclined trailing angle and operating in a vertical plane parallel with the direction of travel of said vehicle body, a resilient load cushioning means carried by said vehicle body and supporting the trailing ends of said lever members, and a torsion member rotatably mounted upon said vehicle body and extending parallel with said axle to which the forward ends of said lever members are rigidly secured, said torsion member being adapted and arranged to permit a uniform pivotal movement of said lever members in a vertical plane relative to said vehicle body and also resisting any independent pivotal movement of said lever members relative to each other.

2. In a means for maintaining parallelism between the floor of a vehicle body and a supporting axle, the combination of a vehicle body, a supporting axle disposed below and extending transverse to said vehicle body, a lever member at each side of said vehicle upon which said axle is mounted at its ends, said lever members being inclined downwardly at an angle from said vehicle body and engaging said axle intermediate their ends, spring means carried by said vehicle body for resiliently supporting the depending ends of said lever members, and a transversely extending torsion shaft having a length substantially corresponding to the spacing of said lever members upon said axle rotatably mounted upon said vehicle body forward of and parallel with said axle to which the upper ends of said lever members are secured, said torsion shaft being adapted and arranged to cause said lever members to pivot in a vertical plane and substantially in unison relative to said vehicle body and by torsionally resisting independent pivotal movement of said lever members.

3. In a means for preventing transverse tilting of a vehicle body with reference to a transversely extending supporting axle, the combination of a vehicle body, an axle disposed below and extending transverse to said vehicle body having supporting wheels at its ends, a lever member mounted intermediate its ends upon each end of said axle and inclined at a downwardly depending angle with respect to said body member, a pivotal bearing carried by said vehicle body at the forward ends of said lever members, a torsion shaft carried by said pivotal bearings to which the forward ends of said lever members are rigidly secured, and spring means carried by said vehicle body forming a resilient support for the trailing ends of said lever members, said torsion shaft being disposed above and parallel with said axle and adapted and arranged to permit a free pivotal movement of said lever members in a vertical plane parallel with longitudinal axis of said vehicle body and resist relative angular displacement of said lever members with respect to each other due to an uneven distribution of load in said vehicle body.

4. In a self-leveling resilient spring support for a wheeled vehicle, the combination of a vehicle body, a supporting axle disposed transverse to said vehicle body, an inclined lever member mounted at its center upon each end of said axle as a fulcrum, a torsion shaft of a length corresponding substantially to width of said vehicle body and extending parallel to said axle and rotatably secured to the body of said vehicle at one side of said axle to which the corresponding ends of said lever members are fixedly secured, and spring means carried by said vehicle at the other side of said axle for resiliently supporting the other ends of said lever members, whereby said torsion shaft will operate to maintain a substantially parallel relationship between said vehicle body and said axle irrespective of the position of a load carried by said vehicle with respect to the ends of said axle.

JOHN MOORE.

REFERENCES CITED

The following references are of record in the file of this patent:

UNITED STATES PATENTS

| Number | Name | Date |
|---|---|---|
| 1,831,631 | Manns | Nov. 10, 1931 |
| 2,104,245 | Romeo | Jan. 4, 1938 |
| 2,194,832 | McIntyre | Mar. 26, 1940 |
| 2,219,140 | Olsen | Oct. 22, 1940 |